United States Patent [19]

Miyao et al.

[11] Patent Number: 5,397,636
[45] Date of Patent: Mar. 14, 1995

[54] HYBRID LAMINATED PREPREG AND SKI POLE SHAFT USING THE SAME

[75] Inventors: Makiji Miyao; Osamu Watanabe; Makoto Takezawa; Hiroshi Inoue, all of Saitama, Japan

[73] Assignee: Tonen Corporation, Tokyo, Japan

[21] Appl. No.: 986,815

[22] Filed: Dec. 8, 1992

[30] Foreign Application Priority Data

Dec. 11, 1991 [JP] Japan .................. 3-350905
Oct. 9, 1992 [JP] Japan .................. 4-296568

[51] Int. Cl.⁶ ............................... B32B 9/00
[52] U.S. Cl. ........................... 428/195; 428/36.3; 428/35.9; 428/76; 428/203; 428/205; 428/213; 428/246; 428/283; 428/290; 428/293; 156/166; 156/243; 156/327; 156/494
[58] Field of Search .......... 428/195, 76, 246, 283, 428/35.7, 36.3, 205, 203, 213, 290, 293; 156/166, 243, 327, 494

[56] References Cited

U.S. PATENT DOCUMENTS 5,035,764  7/1991  Blake ........................... 428/408

FOREIGN PATENT DOCUMENTS 0078424  11/1983  European Pat. Off. .
0432721   6/1991  European Pat. Off. .
2848615   5/1979  Germany .

*Primary Examiner*—Patrick J. Ryan
*Assistant Examiner*—Abraham Bahta
*Attorney, Agent, or Firm*—Seidel, Gonda, Lavorgna & Monaco

[57] ABSTRACT

A hybrid laminated prepreg is disclosed, which comprises a resin layer, a decorative layer laminated thereon and having a pattern, and a transparent prepreg layer laminated on the decorative layer. In manufacturing a fiber reinforced composite resin material molding, the hybrid prepreg is laminated in a couple of layers on the outermost one of laminated layers of usual prepreg. Thus, it is possible to easily decorate the obtainable molding to readily provide an aesthetic sense to the appearance of the molding and also dispense with time-consuming operation of coating or the like. Further, unlike the coating or the like, it is possible to stably hold the aesthetic sense of the appearance for long time. The hybrid laminated prepreg can be suitably used for fiber reinforced composite resin material moldings, for instance such sport articles as golf club shafts, tennis rackets, ski pole shafts and fishing rods, fancy articles, briefcases such as attache cases, pipes such as bicycle frames and panels such as fair-faced wall panels.

11 Claims, 4 Drawing Sheets

HYBRID LAMINATED PREPREG AND SKI POLE SHAFT USING THE SAME

BACKGROUND OF THE INVENTION

This invention relates to hybrid laminated prepregs suitably used for the outermost layer of fiber reinforced composite resin material moldings, for instance such sport articles as golf club shafts, tennis rackets, ski pole shafts and fishing rods, fancy articles, briefcases such as attache cases, pipes such as bicycle frames and such panels as fair-faced wall panels to provide aesthetic appearance of these moldings. The invention also relates to fiber reinforced composite resin material ski pole shafts using the above hybrid laminated prepregs for the outermost layer of the shaft and having excellent aesthetic appearance.

Recently, fiber-reinforced composite resin material moldings, which are obtained by molding and hardening prepregs, i.e., fiber reinforced composite resins containing carbon fibers or like reinforcement fibers, are finding applications in various fields owing to their light weight and high mechanical strength. Fiber reinforced composite resin material moldings proposed and sold extensively include such sport articles as golf club shafts, tennis rackets, ski pole shafts and finishing rods, fancy articles, briefcases such as attache cases, pipes such as bicycle frames and such panels as fair-faced wall panels.

As such molding, a ski pole shaft comprises a plurality of fiber reinforced composite resin material layers. FIG. 8 shows such a structure. As shown, a predetermined number of fiber reinforced prepregs 101, cut to a predetermined shape and size, are wound on a mandrel 100, and the prepregs 101 are rendered to fiber reinforced composite resin materials by hardening the matrix resin, thus obtaining fiber reinforced composite resin material ski pole shaft. As will be understood more clearly with reference to FIG. 6 as well, to improve the twisting and bending performance the fiber reinforced prepregs include a prepreg $101S_1$ (straight layer $101S_1'$), in which reinforcement fibers extend parallel ($\theta=0°$) to the axis of the ski pole shaft, prepregs 101A ($101A_1$ and $101A_2$) (angle layers $101A'$), in which reinforcement fibers are inclined at an angle (usually $\theta=25°$ to $90°$) in opposite directions with respect to the axis of the ski pole shaft, and a prepreg $101S_2$ (straight layer $101S_2'$), in which reinforcement fibers extend parallel ($\theta=0°$) to the axis of the ski pole shaft. In many cases, the basic structure is as shown in FIG. 6, using the prepregs $101S_1$ and $101S_2$ (straight layers $101S_1'$ and $101S_2'$) as the innermost and outermost layers and the prepregs 101A (angle layers $101A'$) as the intermediate layers. Sometimes, the layers 101A (angle layers $101A'$) are omitted.

As shown in FIG. 7, the ski pole shaft may have a cylindrical structure having a uniform cross sectional size (FIG. 7(A)) or a tapered structure (FIG. 7(B)).

In the meantime, it is important that the fiber reinforced composite resin material moldings such as ski pole shafts, golf club shafts and tennis rackets as noted above have excellent aesthetic appearance. Usually, after a molding is obtained by winding, laminating and hardening prepregs on a mandrel, the aesthetic appearance is provided by polishing and coating. The operation of providing the aesthetic appearance, therefore, requires considerable man-hour. In addition, the decorated outer surface obtained by coating or the like lacks mechanical strength, and while the molding is used, break-away or wear of the coating layer of the decorated surface occur to spoil the aesthetic sense of the appearance.

For this reason, there is a demand for using a hybrid laminated prepreg with a decorative layer as the outermost layer in combination of usual prepreg in producing such fiber reinforced composite resin material moldings as ski pole shafts, golf club shafts and tennis rackets by using prepregs, thus permitting the aesthetic sense to be readily provided to the appearance of the molding, as well as dispensing with the time-consuming coating operation or the like and ensuring stable aesthetic appearance for long time. However, there has been proposed no such hybrid laminated prepreg, which has properties effective for readily meeting the above demand.

SUMMARY OF THE INVENTION

An object of the invention is to provide a hybrid laminated prepreg, which has such properties as being able to be used in combination with usual prepreg to produce fiber reinforced composite resin material moldings to simply decorate the moldings, readily provide an aesthetic sense to the appearance of the moldings, dispense with time-consuming coating operation or the like and ensure stable aesthetic sense of the appearance for long time.

Another object of the invention is to provide fiber reinforced composite resin material ski pole shaft, which is obtainable by using the above hybrid prepreg in combination with usual prepregs, obtainable without need of time-consuming operation of coating or the like, permitting aesthetic appearance to be readily obtained, and ensuring stable aesthetic appearance for long time.

The above objects are accomplished by the hybrid laminated prepreg and the ski pole shaft using the same prepreg according to the invention.

In summary, the hybrid laminated prepreg according to the invention comprises a resin layer, a decorative layer laminated on the resin layer and having a decorative pattern, and a transparent prepreg layer laminated on the decorative layer. The decorative layer may comprises a base on which a decorative pattern is provided by a printing or electro-photographic process. The decorative pattern may be pictures, patterns or logomarks. The base is capable of being permeated by resin from the resin layer and preferably provides transparency when permeated by resin. The decorative pattern may have a ground layer to prevent resin permeation between the base and the pattern. The base may have concealing capability with respect to color. Further, a transparent resin layer may be laminated between the decorative layer and the transparent prepreg layer.

The fiber reinforced composite resin material ski pole shaft according to the invention has at least one hybrid layer as the outermost one of a plurality of fiber reinforced composite resin material layers, the hybrid layer comprising a resin layer, a decorative layer laminated on the resin layer and having a pattern, and a transparent fiber reinforced composite resin material layer laminated on the decorative layer.

DETAILED DESCRIPTION OF THE PREFERRED EMBODIMENTS

Figure 1:
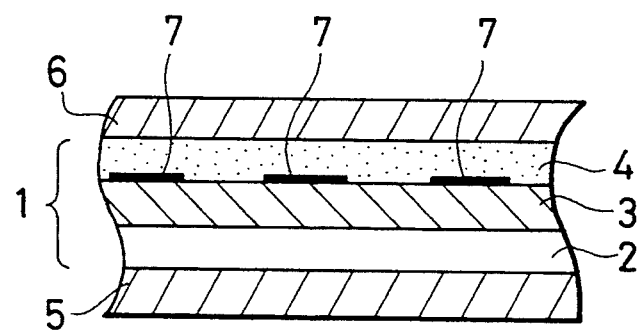
FIG. 1 is a sectional view showing an embodiment of the hybrid laminated prepreg according to the invention.

FIG. 1 is a sectional view showing a preferred embodiment of the hybrid laminated prepreg according to the invention.

As shown in the Figure, the hybrid laminated prepreg according to the invention basically comprises a resin layer 2, a decorative layer 3 laminated thereon, and a transparent fiber reinforced composite resin layer, i.e., transparent prepreg layer 4, laminated on the decorative layer 3. This hybrid laminated prepreg 1 is used in combination with usual prepreg to produce a fiber reinforced composite resin material molding such that it is laminated as the outermost layer of a lamination of usual prepreg layers wound for lamination on a mandrel or the like, the decorative layer 3 thus providing an aesthetic sense of appearance to the molding obtained by hardening the overall prepregs. The whole hybrid laminated prepreg 1 is supported on a releasing paper 5, on which the innermost resin layer 2 is laminated. A transparent cover film 6 is laminated on the outer transparent prepreg layer 4, if desired. The releasing paper 5 and a cover film 6 are removed when the hybrid laminated prepreg 1 is used.

The resin layer 2 provides for adhesion of the hybrid prepreg 1 to the outermost layer of the usual prepreg lamination, on which the prepreg 1 is laminated. As the resin layer 2 may be used thermosetting epoxy resins or like usual matrix resins used for usual prepregs. The resin layer 2 is usually transparent but may not be transparent. The weight of the resin layer 2 on the releasing paper 5 is 5 to 200 g/m², preferably 10 to 100 g/m².

The decorative layer 3 serves to impart the molding with an aesthetic sense of appearance, and it has a pattern 7. The decorative layer 3 comprises a base on which the pattern 7 is formed. The pattern 7 is provided on the side of the decorative layer 3 opposite the resin layer 2, i.e., on the upper side in the Figure. The pattern 7 may be pictures, patterns or logomarks. It may be mere coloring of the surface of the decorative layer 3. The coloring may be partial or entire coloring of the surface of the decorative layer 3. Further, the pattern 7 may be formed in a single color or a plurality of different colors.

As the decorative layer 3 with the pattern 7 may be used a paper or resin sheet with the pattern 7 provided by a printing or electrophotographic process. Such a paper sheet as the base with the pattern 7 provided thereon, is suitably capable of being uniformly impregnated with resin from the resin layer 2 to provide enhanced integrity with the resin layer 2. Likewise, the resin sheet noted above suitably has high affinity to the resin in the resin layer 2. If the base is resin-permeable, it is possible for air bubbles present in the resin layer 2 to pass through the base to the prepreg layer 4. Thus, it is possible to obtain an effect of purging air bubbles through the prepreg layer 4 to the outside.

The paper or resin sheet as the base of the decorative layer 3 is further suitably capable of becoming transparent when permeated by resin from the resin layer 2. In this case, the pattern 7 of the decorative layer 3 looks like floating with the transparent base as background, and thus it is possible to provide more excellent aesthetic sense to the appearance of the molding. Examples of such base are thin paper sheets or non-woven cloths of thermoplastic resins such as nylon and PET having thicknesses of 15 to 100 μm.

Figure 2:
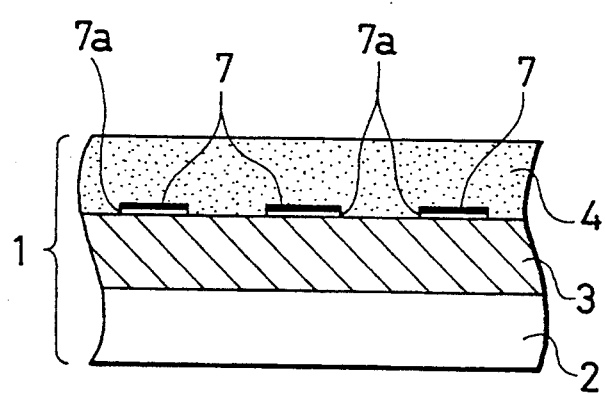
FIG. 2 is a sectional view showing a structure, in which a ground layer is provided under a pattern of the decorative layer in the hybrid laminated prepreg shown in FIG. 1.

The ink used for the pattern 7 is suitably free from deterioration and fading by heat provided when hardening the prepreg to obtain a molding. Further, in order to prevent adverse effects of the resin permeating the decorative layer 3 from the inner resin layer 2 on the pattern 7, the pattern 7 may have an inner ground layer 7a as shown in FIG. 2, which is printed with a resin permeation prevention ink. With this arrangement, it is possible to prevent the pattern 7 from becoming turbid by fusion or being discolored by the permeated resin, thus further improving the stability of the pattern 7. Such ink may be those, which are usually used for concealing the ground, contain such pigments as $TiO_2$ and have ground concealing capability.

The above mentioned matters can be also said in case of forming the pattern 7 by electrophotography using toner.

If it is desired to conceal the color of usual prepreg with the hybrid prepreg 1 laminated thereon even with sacrifice in the transparency due to permeation with resin in the base of the decorative layer 3, as the base may be used a paper sheet containing $TiO_2$ or like pigment having concealing power with respect to the color of the ground or a sheet of an opaque resin.

The thickness of the decorative layer 3 is about 5 to 300 μm, preferably 10 to 500 μm.

The prepreg layer 4 has a role of protecting the inner decorative layer 3. According to the invention, it is transparent to let the pattern 7 of the decorative layer 3 be seen from the outer side of the prepreg layer 4. As such prepreg layer 4 may be used a transparent prepreg comprising transparent reinforcement fibers and a matrix resin.

As the transparent fibers may be used glass fibers, alumina fibers and quartz fibers. These transparent fibers may be used alone, or a plurality of different transparent fibers may be used in hybrid combination. Further, they may be used in the form of uni-directional arrangement or in the forms of cloth or mat. In the case of the use of transparent fibers in the form of cloth or mat, it is possible to use a plurality of pieces of cloth or mat by laminating these pieces such that fibers overlap in the same direction or by laminating these pieces in hybrid combination such that the fibers overlap in an inclined fashion.

As a general rule, usual thermosetting resins such as epoxy resins may be used as the matrix resin. From the standpoint of providing the transparency of the prepreg layer 4, however, resins lacking transparency are not used.

The thickness of the transparent prepreg layer 4 is 10 to 200 μm, preferably 50 to 100 μm. The amount of the transparent fibers in the transparent prepreg layer 4 per unit area thereof is 30 to 200 g/m$^2$, preferably 70 to 120 g/m$^2$. The amount of the matrix resin in the prepreg layer 4 is 20 to 80% by weight, preferably 30 to 79% by weight.

The whole thickness of the hybrid laminated prepreg 1 is adequately 50 to 500 μm. If the thickness of the hybrid prepreg 1 is less than 50 μm, it is too thin and makes it difficult to produce the prepreg 1. In addition, such thin prepreg is impractical for producing fiber reinforced composite resin material moldings. If the thickness exceeds 500 μm, it is excessive and makes it difficult to produce fiber reinforced composite resin material moldings with satisfactory moldability.

The hybrid laminated prepreg 1 according to the invention may be manufactured in any way. In a typical method of manufacture, on a resin-coated paper is stacked a paper or like sheet with printed pattern 7 such that the pattern 7 is on the side opposite the resin layer, and a transparent prepreg is stacked on the paper or like sheet. The stack is then pressed with a thermal press from the outside of the support of the transparent prepreg and the resin-coated paper, thus integrating the resin of the resin-coated sheet, the paper or like sheet with the pattern 7 and the transparent prepreg.

Alternatively, in case of manufacturing the transparent prepreg by pressing transparent fibers stacked on the resin-coated paper with a thermal press, transparent fibers are arranged on the paper or like sheet with the pattern 7 stacked on an another resin-coated paper, the above resin-coated paper for the transparent prepreg is then stacked on the arranged fibers, and the stack is pressed from the outer side of the outer and inner resin-coated papers with a thermal press. In this way, it is possible to manufacture the hybrid laminated prepreg by forming the transparent prepreg from the resin of the outer resin-coated paper and the transparent fibers while also integrating the transparent prepreg, the paper or like sheet with the printed pattern 7 and the resin of the lower resin-coated paper.

In the manufacture of fiber reinforced composite resin material moldings, the hybrid prepreg 1 is usually used in combination with usual prepreg such as carbon fiber prepreg. For example, in a golf club shaft, which basically comprises an inner layer consisting of angle or straight layers and an outer layer consisting of straight or angle layers, the outer layer being combined with and of the opposite kind to layers of the inner layer, a couple of layers of the hybrid laminated prepreg 1 are used with the resin layer 2 on the inner side as the outermost layer of the outer layer consisting of the angle or straight layers.

As an example, in the case of a golf club shaft, the outermost layer of which is a straight layer, usual prepreg such as carbon fiber prepreg is wound on a mandrel a predetermined number of turns for the angle layer with the direction of the fiber arrangement inclined with respect to the axis of the mandrel and a predetermined number of turns for the straight layer with the direction of the fiber arrangement made pallalel to the mandrel axis, and when winding the straight layer the hybrid prepreg 1 is wound a couple of turns as the outermost layer. Then, a retainer tape is wound to prevent deformation of the usual prepreg and the hybrid laminated prepreg 1, and in this state the matrix resin is hardened by a heat treatment. In this way, the fiber-reinforced composite resin layers of the usual prepreg and hybrid laminated prepreg 1 are rendered into fiber reinforced composite resin material layers, thus obtaining a hardened body having a shape of a golf shaft. Subsequently, the hardened body surface may be polished to obtain a finished golf club shaft.

The golf club shaft manufactured in this way using the hybrid laminated prepreg 1 as in this embodiment, is light in weight and has satisfactory mechanical strength. In addition, the pattern 7 of the decorative layer 3 of the hybrid laminated prepreg 1 laminated in a single layer to a plurality of layers as the outermost layer, can be seen through the thin transparent layer of fiber reinforced composite resin material constituted by the transparent prepreg layer 4 at the surface. In other words, the pattern 7 can be seen at the bottom of the thin transparent layer. It is thus possible to provide an improved aesthetical sense of appearance of the golf club shaft and readily provide an aesthetic sense to the appearance.

Further, in case when the base of the decorative layer 3 such as a thin paper or like sheet is capable of being made transparent by resin permeation, the pattern 7 of the decorative layer 3 is seen floating with the transparent base on the background, thus adding an excellent aesthetic sense to the appearance of the golf club shaft. Further, by providing the ground layer 7a of resin permeation prevention ink under the pattern 7, it is possible to eliminate adverse effects of the resin permeating the decorative layer 3 and further increase the stability of the pattern 7.

Further, the decorative layer 3 is protected very firmly by the fiber reinforced composite resin material layers of the transparent prepreg layer 4. Thus, unlike the prior art case of coating or the like, the aesthetic sense provided by the decorative layer 3 is not spoiled by the use of the golf club shaft but is held stably for long time. Further, the aesthetic sense can be provided to the appearance of the golf club shaft by merely laminating a couple of layers of the hybrid laminated prepreg 1 on the outermost one of usual prepreg layers in the fabrication of the golf club shaft. Thus, unlike the case of coating or the like, it is possible to provide aesthetic sense to the appearance without need of any time-consuming operation.

Figure 3:
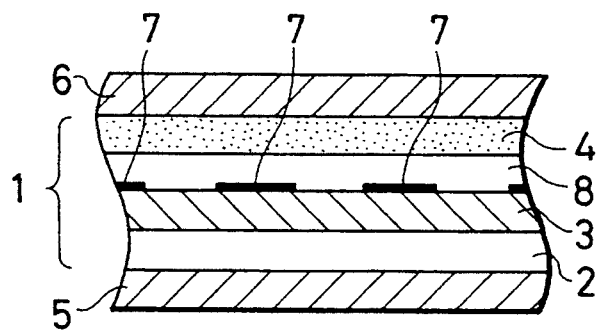
FIG. 3 is a sectional view showing a different embodiment of the hybrid laminated prepreg according to the invention.

FIG. 3 is a sectional view showing a further embodiment of the hybrid laminated prepreg according to the invention. This embodiment features a transparent resin layer 8 that is further laminated between the decorative layer 3 and transparent prepreg layer 4 of the hybrid laminated prepreg 1.

The transparent resin layer 8 is provided for more reliably ensuring the adhesion between the decorative layer 3 comprising a paper or like sheet with the printed pattern 7 and the transparent prepreg layer 4. For this layer can be used the same resin as for the transparent prepreg layer 4. The weight of the transparent resin layer 8 is 10 to 200 g/m$^2$, preferably 20 to 100 g/m$^2$.

With the hybrid laminated prepreg 1 in this embodiment, the adhesion between the decorative layer 3 and the transparent prepreg layer 4 is further reliably ensured by the intervening transparent resin layer 8. The hybrid laminated prepreg 1 thus can more stably provide the aesthetic sense to the appearance with its decorative layer 3 on the outer surface of a golf club shaft or the like produced by using it in combination with usual prepreg.

As described in connection with the previous embodiment, it is possible in this embodiment as well that the paper or resin sheet as the base of the decorative layer 3 may be such as to be made transparent by permeation of resin from the resin layer 2. Also, it is possible to provide a ground layer of a resin permeation prevention ink under the pattern 7.

Figure 4:
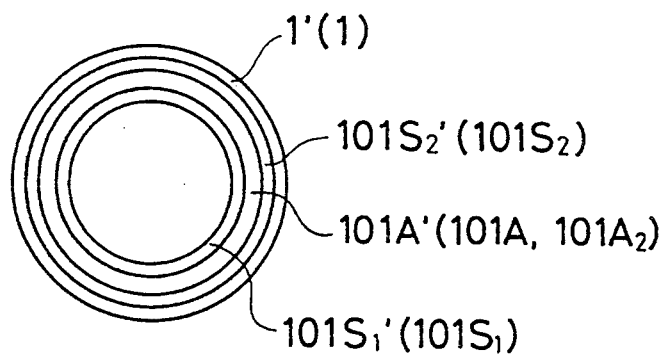
FIG. 4 is a sectional view showing an embodiment of the ski pole shaft produced by using hybrid laminated prepreg according to the invention.

FIG. 4 is a sectional view showing an embodiment of the ski pole shaft using the hybrid laminated prepreg according to the invention.

This ski pole shaft according to the invention is produced basically by hardening a fiber-reinforced composite resin layer $101S_1$, in which carbon reinforcement fibers are parallel ($\theta = 0°$) to the axis of the ski pole shaft, fiber reinforcement composite resin layers $101A_1$ and $101A_2$, in which reinforcement fibers are at an angle (usually $\theta = 25°$ to 90°, preferably 30° to 60°) in opposite directions with respect to the ski pole shaft axis, a fiber-reinforced composite resin layer $101S_1$, in which reinforcement fibers are parallel ($\theta = 0°$) to the ski pole shaft axis, and the hybrid laminated prepreg 1 provided on the outermost one of the fiber reinforced composite resin layers $101S_2$ to provide an aesthetic sense.

In other words, according to the invention it is possible to obtain a ski pole shaft having a straight layer $101S_1'$, an angle layer $101A'$, a straight layer $101S_2'$ and a hybrid layer $1'$. The straight layers $101S_1'$ and $101S_2'$ and angle layer $101A'$ each need not be a single layer but may be a plurality of layers. In some cases, a reinforcement layer may be provided on the opposite ends of the ski pole shaft to make up for insufficient mechanical strength of the ends.

Further, it is possible to omit the angle layer $101A'$ shown in FIG. 4.

As the fiber reinforced composite resin layers $101S_1$, $101S_2$ and $101A$ ($101A_1$ and $101A_2$) forming the straight layers $101S_1'$ and $101S_2'$ and angle layer $101A'$, may be formed by using usual carbon fiber reinforced prepreg. That is, the carbon fiber reinforced prepreg layers $101S_1$, $101S_2$ and $101A$ contain carbon fibers (inclusive of graphite fibers) used as reinforcement fibers, and the matrix resin may be used epoxy resin, unsaturated polyester resin, polyurethane resin, diallyl phthalate resin, phenol resin and other thermosetting matrix resins. Further, hardening agent and other agents such as flexibility provision agent are added adequately such that the hardening temperature is 50° to 200° C.

Of course, it is possible to form the straight layers $101S_1'$ and $101S_2'$ and angle layer $101A'$ by using various prepregs containing glass fibers and like fibers other than carbon fibers, which are well known by those skilled in the art.

The hybrid layer $1'$, which is featured by the invention, is formed by using the hybrid laminated prepreg 1 described before.

A ski pole shaft, which is produced by winding a couple of layers of the hybrid laminated prepreg 1 as the outermost layer, is light in weight and has satisfactory mechanical strength. In addition, the pattern 7 of the decorative layer 3 in the hybrid laminated prepreg 1 laminated in a single layer to a plurality of layers as the outermost layer, can be seen through the thin transparent layer of fiber reinforced composite resin material by the surface transparent prepreg layer 4, that is, the pattern 7 is seen at the bottom of the thin transparent layer. Thus, it is possible to obtain the aesthetic sense of the appearance of the ski pole shaft and ready provide aesthetic sense to the appearance.

Further, in case of using a base such as a thin paper or like sheet capable of being made transparent by the permeation of resin for the decorative layer 3, the pattern 7 thereof is seen floating with the transparent base as background. Thus, a further excellent aesthetic sense can be provided to the appearance of the ski pole shaft. Further, by providing the ground layer 7a of resin permeation prevention ink under the pattern 7, it is possible to eliminate the adverse effects of the resin permeating the decorative layer 3 and further increase the stability of the pattern 7.

Further, since the decorative layer 3 is protected very firmly by the fiber reinforced composite resin material layer of the transparent prepreg 4, unlike the case of coating or the like the aesthetic sense provided by the decorative layer 3 is not spoiled by the use of the ski pole shaft but can be held stably for long time. Further, it is possible to provide an aesthetic appearance to the ski pole shaft by merely laminating a couple of layers of the hybrid laminated prepreg 1 on the outermost one of usual prepreg layers in the manufacture of the ski pole shaft, unlike the case of coating or the like, the aesthetic sense can be provided to the appearance without need of any time-consuming operation.

Examples of the invention will now be described without any sense of limiting them.

EXAMPLES

Example 1

The hybrid laminated prepreg 1 was produced according to the invention, and it was used in combination with usual prepreg to produce a golf club shaft in the following way.

Figure 5:
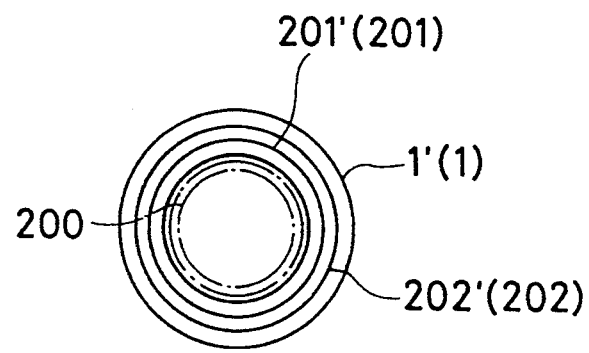
FIG. 5 is a sectional view showing a golf club shaft produced by using hybrid laminated prepreg according to the invention.
Figure 6:
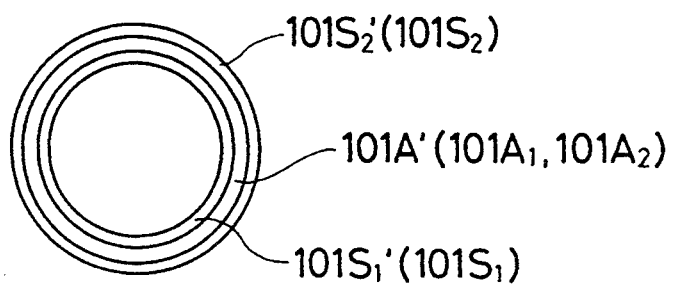
FIG. 6 is a sectional view showing a prior art ski pole shaft.
Figure 7A:
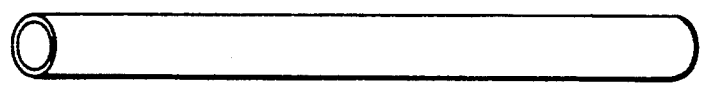
FIGS. 7(A) and 7(B) are perspective views showing examples of the ski pole shaft.
Figure 7B:
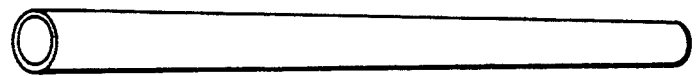

As shown in FIG. 5, a PAN type carbon fiber prepreg (PAN type carbon fiber: tradename "P2053" sold by Toray Industries Inc.) with a thickness of 120 μm and a resin content of 32% was wound a total of 8 turns at +45 and −45 as carbon fiber prepreg 201 for angle layers 201' on a mandrel of a gold club shaft. Then, a PAN type carbon fiber prepreg (PAN type carbon fiber: tradename "T-300" sold by Toray industries Inc.) with a thickness of 120 μm and a resin content of 32% was wound two turns as carbon fiber prepreg 202 for straight layers 202'. Further, the hybrid laminated prepreg 1 according to the invention was wound two turns as second straight layers 1' on the outermost one of the straight layers. Then, a tip portion is reinforced by winding a prepreg using E-glass (by Asahi Fiber Glass Co., Ltd.) as glass fiber for reinforcement layer. Then, a polypropylene rolled tape was wound. The resultant work was then hardened by a heat treatment and then subjected to a predetermined finish process such as polishing, thus obtaining a golf clubshaft.

The hybrid laminated prepreg 1 was prepared by laminating the transparent prepreg layer 4 directly on the decorative layer 3 shown in FIG. 1. The resin layer 2 in the hybrid laminated prepreg 1 had an epoxy resin weight of 50 g/m². As the decorative layer 3 a usual printing paper, which had a thickness of 60 μm and was provided with diamond patterns printed in three colors of red, blue and yellow, was used. The transparent prepreg layer 4 was formed by using a uni-directional glass fiber prepreg using epoxy resin. The thickness of the glass fibers was 50 μm, the amount of the glass fibers was 70 g/m², and the amount of the epoxy resin was 30% by weight.

With the golf club shaft thus obtained, the diamond patterns printed in three colors of red, blue and yellow were located at the bottom of and seen through the thin transparent layer at the golf club shaft surface. The golf club shaft thus had an appearance of a high aesthetic sense and was extremely aesthetically fashionable.

Example 2

A golf club shaft was produced in the same way as in Example 1 except using a thin paper sheet with a thickness of 30 μm and printing a ground layer on the paper sheet with a resin permeation prevention ink prior to the printing of the diamond patterns in three colors of red, blue and yellow.

With the golf club shaft thus obtained, the diamond patterns printed in three colors of red, blue and yellow were seen floating in the thin transparent layer at the golf club shaft surface. Thus, a finer aesthetic sense could be obtained. In addition, the patterns were free from adverse effects of fogging or the like due to resin.

Example 3

The hybrid laminated prepreg 1 was produced according to the invention, and it was used in combination with usual prepreg to produce a ski pole shaft in the following way.

Figure 8:
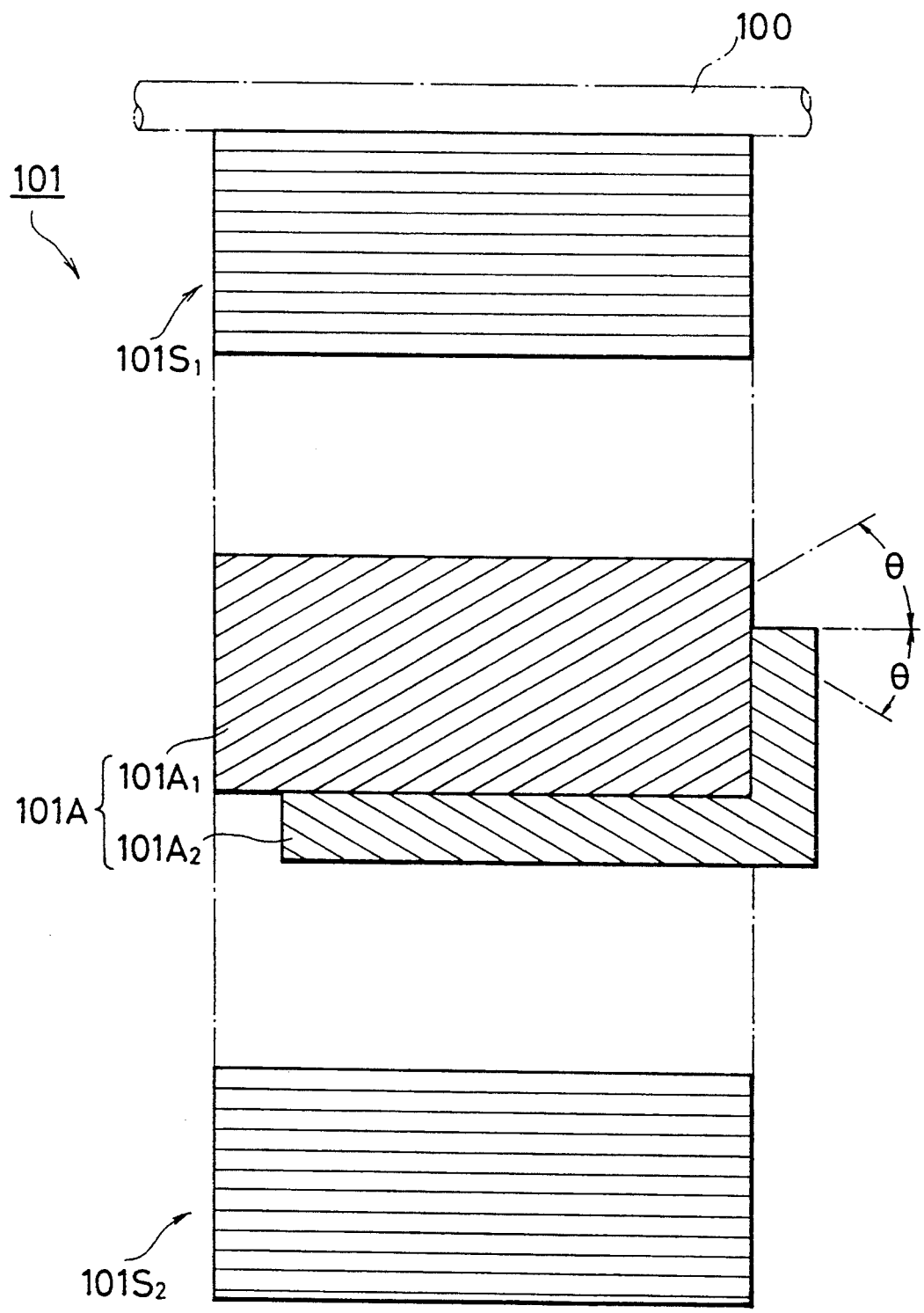
FIG. 8 is a view for explaining a method of fabricating a ski pole shaft.

As shown in FIG. 8, a PAN type carbon fiber prepreg (PAN type carbon fiber : "T-300" by Toray Industries Inc.) with a thickness of 120 μm and a resin content of 32% was wound eight turns as carbon fiber prepreg 101S$_1$ for straight layers 101S$_1$' on a mandrel 100 of a ski pole shaft. Then, E-glass with a thickness of 130 μm and a resin content of 35% was wound two turns at +30 and −30 as glass fiber prepreg 101A for angle layers 101A'. Then, another PAN type carbon fiber prepreg (PAN type carbon fiber: "T-300" by Toray Industries Inc.) was wound eight turns as carbon fiber prepreg 101S$_2$ for straight layers 101S$_2$'. Further, as the outermost layer, the hybrid laminated prepreg 1 was wound two turns for second straight layers 1', as shown in FIG. 4. Then, taping was made with a polypropylene rolled tape. The work was then hardened by a heat treatment and then subjected to a predetermined finish process such as polishing, thus obtaining a ski pole shaft.

The hybrid prepreg 1 was prepared by laminating the transparent prepreg layer 4 directly on the decorative layer 3 shown in FIG. 1. The resin layer 2 of the hybrid prepreg 1 had an epoxy resin weight of 50 g/m$^2$. The decorative layer 3 used a usual printing paper, which had a thickness of 60 μm and had a print of diamond patterns in three colors of red, blue and yellow. The transparent prepreg 4 was formed by using a uni-directional fiber prepreg using epoxy resin. The thickness of the glass fiber was 80 μm, and amount of the glass fibers was 100 g/m$^2$, and the amount of the epoxy resin was 35% by weight.

With the ski pole shaft thus obtained, the diamond patterns printed in three colors of red, blue and yellow were located at the bottom of and seen through the thin transparent layer at the ski pole shaft surface. The ski pole shaft thus had an appearance with a high aesthetic sense and was extremely aesthetically fashionable. The aesthetic sense of the appearance was not readily lost by use of the ski pole shaft for long time.

Example 4

A ski pole shaft was produced in the same way as in Example 3 except using the hybrid laminated prepreg 1 shown in FIG. 3, having the transparent resin layer 8 laminated between the decorative layer 3 and the transparent prepreg layer 4. The transparent resin layer 8 had an epoxy resin weight of 50 g/m$^2$. With the ski pole shaft thus obtained, the diamond patterns printed in three colors of red, blue and yellow were seen at the bottom of the thin transparent layer at the ski pole shaft surface. The ski pole shaft thus had an appearance with a high aesthetic sense and was extremely aesthetically fashionable. The aesthetic sense of the appearance was not readily lost by use of the ski pole shaft for long time.

Example 5

A ski pole shaft was produced in the same way as an Example 3 except for using a thin paper sheet with a thickness of 30 μm as the base of the decorative layer 3 and printing a ground layer with a resin permeation prevention ink on the paper prior to the printing of the diamond patterns in three colors or red, blue and yellow.

With the ski pole shaft thus obtained, the diamond patterns printed in three colors of red, blue and yellow were seen floating in the thin transparent layer at the ski pole shaft surface. Thus, more beautiful appearance could be obtained. The patterns were free from adverse effects such as fogging by resin.

As has been described in the foregoing, the hybrid laminated prepreg according to the invention comprises a resin layer, a decorative layer laminated thereon and having a pattern, and a transparent prepreg layer laminated on the decorative layer. In the manufacture of fiber reinforced composite resin material moldings, for example such sport articles as golf club shafts, tennis rackets and fishing rods, fancy articles, briefcases such as attache cases, pipes such as bicycle frames and panels such as fair-faced wall panels, the hybrid prepreg can be used in combination with usual prepreg by laminating it in a couple of layers on the outermost one of laminated layers of the usual prepreg. Thus, the obtainable fiber reinforced composite resin material molding can be easily decorated with the decorative layer of the hybrid laminated prepreg to readily provide an aesthetic sense to the appearance of the molding, and time-consuming coating or like operation can be dispensed with. Further, unlike the case of coating or the like the aesthetic sense of the appearance can be held stably for long time.

Further, the ski pole shaft of fiber reinforced composite resin material according to the invention has a structure obtained by laminating on the outermost one of a plurality of fiber reinforced composite resin material layers a hybrid layer comprising a resin layer, a decorative layer laminated thereon and having a pattern and a transparent fiber reinforced composite resin material layer laminated on the decorative layer. Thus, it is possible to readily obtain an aesthetic sense of the ski pole shaft appearance without need of time-consuming coating or like operation, and the aesthetic sense thus provided can be held stably for long time.

What is claimed is:

1. A hybrid laminated prepreg comprising a resin layer, a decorative layer laminated on said resin layer and having a pattern, and transparent reinforcement fibers in a transparent resin matrix laminated on said decorative layer, wherein said hybrid laminated prepreg has a thickness ranging from about 50 μm to about 500 μm.

2. The hybrid laminated prepreg according to claim 1, wherein said pattern is a picture, a pattern or a logomark.

3. The hybrid laminated prepreg according to claim 1, wherein said decorative layer comprises a base on which said pattern is provided by a printing or electrophotographic process.

4. The hybrid laminated prepreg according to claim 3, wherein said base is capable of being permeated by resin from said resin layer.

5. The hybrid laminated prepreg according to claim 4, wherein said base is capable of being made transparent by permeation of resin from said resin layer.

6. The hybrid laminated prepreg according to claim 5, wherein said base is a thin paper sheet or a nonwoven cloth of a thermoplastic resin having a thickness of 15 to 100 μm.

7. The hybrid laminated prepreg according to claim 4, wherein said pattern has a ground layer for resin permeation prevention provided on said base.

8. The hybrid laminated prepreg according to claim 3, wherein said base has color concealing power.

9. The hybrid laminated prepreg according to claim 1, wherein a transparent resin layer is laminated between said decorative layer and said transparent prepreg layer.

10. The hybrid laminated prepreg according to claim 5, wherein said pattern has a ground layer for resin permeation prevention provided on said base.

11. The hybrid laminated prepreg according to claim 6, wherein said pattern has a ground layer for resin permeation prevention provided on said base.

* * * * *